US010830150B2

(12) United States Patent
Snyder et al.

(10) Patent No.: US 10,830,150 B2
(45) Date of Patent: Nov. 10, 2020

(54) FUEL HEAT EXCHANGER WITH LEAK MANAGEMENT

(71) Applicants:Rolls-Royce Corporation, Indianapolis, IN (US); Rolls-Royce North American Technologies Inc., Indianapolis, IN (US)

(72) Inventors: Douglas J. Snyder, Carmel, IN (US); Ronald A. Hall, Indianapolis, IN (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 596 days.

(21) Appl. No.: 15/602,576

(22) Filed: May 23, 2017

(65) Prior Publication Data
US 2017/0254269 A1    Sep. 7, 2017

Related U.S. Application Data

(63) Continuation-in-part of application No. 15/411,239, filed on Jan. 20, 2017.
(Continued)

(51) Int. Cl.
*F02C 7/22* (2006.01)
*F23R 3/28* (2006.01)
(Continued)

(52) U.S. Cl.
CPC .............. *F02C 7/222* (2013.01); *F01D 17/02* (2013.01); *F02C 3/04* (2013.01); *F02C 7/141* (2013.01); *F02C 7/185* (2013.01); *F02C 7/224* (2013.01); *F23R 3/283* (2013.01); *F05D 2240/35* (2013.01); *F05D 2260/204* (2013.01); *F05D 2260/213* (2013.01)

(58) Field of Classification Search
CPC .. F02C 7/22; F02C 7/222; F02C 7/224; F02C 7/232; F02C 7/14; F02C 7/25; F23R 3/283; F05D 2240/35; F05D 2260/204
See application file for complete search history.

(56) References Cited

U.S. PATENT DOCUMENTS 3,535,875 A    10/1970    Sneeden et al.
4,120,150 A    10/1978    Wakeman
(Continued)

FOREIGN PATENT DOCUMENTS

CN    104110309 A    10/2014
EP    2664766 A1    11/2013
(Continued)

OTHER PUBLICATIONS

Extended EP Search Report dated Sep. 18, 2018 and issued in connection with EP Appln. No. 18169171.8.
(Continued)

*Primary Examiner* — Todd E Manahan
*Assistant Examiner* — Thuyhang N Nguyen
(74) *Attorney, Agent, or Firm* — Barnes & Thornburg LLP (57) ABSTRACT

A cooling air system for use in a gas turbine engine includes a microchannel fuel-air heat exchanger. The fuel-air heat exchanger allows heat transfer between a flow of cooling air used to cool components of the engine and a flow of fuel used to drive the engine.

21 Claims, 3 Drawing Sheets

Related U.S. Application Data (60) Provisional application No. 62/288,114, filed on Jan. 28, 2016.

(51) Int. Cl.
*F01D 17/02* (2006.01)
*F02C 3/04* (2006.01)
*F02C 7/141* (2006.01)
*F02C 7/224* (2006.01)
*F02C 7/18* (2006.01)

(56) References Cited

U.S. PATENT DOCUMENTS

| | | | |
|---|---|---|---|
| 4,229,944 A | 10/1980 | Weiler | |
| 5,351,477 A | 10/1994 | Joshi et al. | |
| 5,735,115 A | 4/1998 | Maghon | |
| 5,915,626 A | 6/1999 | Awarzamani et al. | |
| 6,481,641 B1 | 11/2002 | Mieney | |
| 6,763,663 B2 | 7/2004 | Mansour et al. | |
| 6,993,913 B2 | 2/2006 | Kobayashi et al. | |
| 8,127,547 B2 | 3/2012 | Norris et al. | |
| 8,342,425 B2 | 1/2013 | Imoehl | |
| 8,479,518 B1 | 7/2013 | Chen | |
| 8,820,047 B2 | 9/2014 | Saito et al. | |
| 9,074,566 B2 | 7/2015 | Czimmek et al. | |
| 9,506,835 B2 * | 11/2016 | Konatham | G01M 3/04 |
| 2004/0040306 A1 | 3/2004 | Prociw et al. | |
| 2007/0101731 A1 | 5/2007 | Bayt et al. | |
| 2010/0071667 A1 | 3/2010 | Hicks et al. | |
| 2011/0005232 A1 | 1/2011 | Williams et al. | |
| 2011/0088405 A1 | 4/2011 | Turco | |
| 2011/0107769 A1 | 5/2011 | Stevenson et al. | |
| 2011/0302928 A1 | 12/2011 | Mudawar | |
| 2013/0219915 A1 | 8/2013 | Prociw et al. | |
| 2013/0341430 A1 * | 12/2013 | Hall | F02M 61/167 239/533.2 |
| 2014/0060057 A1 | 3/2014 | John et al. | |
| 2014/0210984 A1 | 7/2014 | Warwick et al. | |
| 2014/0238036 A1 | 8/2014 | Uhm et al. | |
| 2014/0327194 A1 | 11/2014 | Matusewicz et al. | |
| 2015/0000291 A1 | 1/2015 | Smith et al. | |
| 2015/0052980 A1 | 2/2015 | Sheldon et al. | |
| 2015/0323188 A1 | 11/2015 | Rista et al. | |
| 2016/0025009 A1 | 1/2016 | Morenko et al. | |
| 2016/0138873 A1 | 5/2016 | Dyer | |
| 2016/0161189 A1 | 6/2016 | Borghese et al. | |
| 2016/0290290 A1 | 10/2016 | Lo | |

FOREIGN PATENT DOCUMENTS

| | | |
|---|---|---|
| EP | 2677240 A2 | 12/2013 |
| EP | 3075983 A1 | 10/2016 |
| EP | 3199871 A1 | 8/2017 |
| FR | 2817016 A1 | 5/2002 |
| GB | 2476253 A | 6/2011 |
| WO | 2015054136 A1 | 4/2015 |
| WO | 2015112215 A2 | 7/2015 |

OTHER PUBLICATIONS

Extended EP Search Report dated Oct. 24, 2018 and issued in connection with EP Appln. No. 18170080.8.
Extended European Search Report, European Application No. 17152879.7-1605, dated Jul. 3, 2017, 10 pages.

* cited by examiner

FUEL HEAT EXCHANGER WITH LEAK MANAGEMENT

CROSS REFERENCE TO RELATED APPLICATIONS

This application is a continuation-in-part of, and claims the benefit of and priority to, U.S. Non-Provisional patent application Ser. No. 15/411,239, filed Jan. 20, 2017, which claims priority to and the benefit of U.S. Provisional Patent Application No. 62/288,114, filed Jan. 28, 2016, the disclosures of each of which are now expressly incorporated herein by reference, including but not limited to those portions related to turbine heat exchanger design and operation.

BACKGROUND

The present disclosure relates generally to gas turbine engines, and more specifically to fuel heating systems of a gas turbine engine.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Heating fuel prior to combustion can provide efficiency gains. However, fuel heating presents design challenges, particularly as the risk of inadvertent combustion is present.

SUMMARY

The present application discloses one or more of the features recited in the appended claims and/or the following features which, alone or in any combination, may comprise patentable subject matter.

According to an aspect of the present disclosure, a microchannel fuel heat exchanger may include a fuel passageway fluidly coupled to pass fuel and a heat source passageway arranged in thermal communication with the fuel passageway to transmit heat to fuel within the fuel passageway. The fuel heat exchanger may include a leak management system arranged to guide leakage from at least one of the fuel and heat source passageways to discourage hazardous condition formation. In some embodiments, at least one of the fuel and heat source passageways may be microchannel passageways. In some embodiments, each of the fuel and heat source passageways may be microchannel passageways.

In some embodiments, the leak management system may include a leakage capture channel. In some embodiments, the leakage capture channel may be arranged at least partly between fuel passageway and the heat source passageway for capturing and guiding leakage.

In some embodiments, the fuel heat exchanger may include an interface wall disposed between and providing thermal communication between the fuel and heat source passageways, the leak capture channel formed at least partially within the interface wall.

In some embodiments, the interface wall may include at least one communication bridge for thermal communication between the fuel and heat source passageways, the communication bridge extending through the leak capture channel.

In some embodiments, the at least one communication bridge may be formed as a pin arranged to conduct heat transfer between the heat source passageway and the fuel passageway.

In some embodiments, the at least one communication bridge may include a plurality of pins extending through the leak capture channel to conduct heat transfer between the heat source passageway and the fuel passageway.

In some embodiments, the leak capture channel may be formed as a microchannel cavity and arranged to capture leakage from the fuel passageway passing through the interface wall on occurrence of an imperfection.

In some embodiments, the imperfection may include a crack in the interface wall extending between the leak capture channel and at least one of the fuel and heat source passageways.

In some embodiments, the leak management system may include a leakage manifold fluidly coupled with the leak capture channel to receive leakage. In some embodiments, the leak management system may include a leakage detector arranged within the leakage manifold to detect the presence of leakage. In some embodiments, the leakage detector may include at least one of a pressure sensor, a temperature sensor, and a hydrocarbon sensor.

In some embodiments, the leakage manifold may be a fluid compartment having predetermined volume and arranged in fluid communication with the leak capture channel, the leakage manifold including no more than two ports for communication outside of the fuel injector. In some embodiments, the leakage manifold may include no more than one port for communication outside of the fuel injector. In some embodiments, the leakage manifold may include no ports for communication outside of the fuel injector.

According to another aspect of the present disclosure, a fuel injector for a gas turbine engine may include a nozzle configured to discharge fuel into a combustion chamber included in the gas turbine engine, a stem coupled to the nozzle and configured to conduct fuel to the nozzle, and a microchannel fuel heat exchanger. In some embodiments the microchannel fuel heat exchanger may be formed as a microchannel fuel-air heat exchanger. The microchannel fuel-air heat exchanger may be integral with the stem and/or may include a fuel passageway fluidly coupled with the nozzle to pass fuel and a cooling air passageway arranged in thermal communication with the fuel passageway to transmit heat to fuel within the fuel passageway. The fuel-air heat exchanger may include a leak management system arranged to guide leakage from at least one of the fuel and cooling air passageways to discourage hazardous condition formation. In some embodiments, each of the fuel and cooling air passageways may be microchannel passageways.

In some embodiments, the leak management system may include a leakage capture channel. In some embodiments, the leakage capture channel may be arranged at least partly between fuel passageway and the heat source passageway for capturing and guiding leakage.

In some embodiments, the fuel-air heat exchanger may include an interface wall disposed between and providing thermal communication between the fuel and air passageways, the leak capture channel formed at least partially within the interface wall. In some embodiments, the interface wall may include at least one communication bridge for thermal communication between the fuel and air passageways, the communication bridge extending through the leak capture channel. In some embodiments, the at least one communication bridge may be formed as a pin arranged to conduct heat transfer between the cooling air passageway and the fuel passageway. In some embodiments, the at least one communication bridge may include a plurality of pins extending through the leak capture channel to conduct heat transfer between the cooling air passageway and the fuel passageway.

In some embodiments, the leak capture channel may be formed as a microchannel cavity and arranged to capture leakage from the fuel passageway passing through the interface wall on occurrence of an imperfection. In some embodiments, the imperfection may include a crack in the interface wall extending between the leak capture channel and at least one of the fuel and air passageways. In some embodiments, the leak management system may include a leakage manifold fluidly coupled with the leak capture channel to receive leakage.

In some embodiments, the leak management system may include a leakage detector arranged within the leakage manifold to detect the presence of leakage. In some embodiments, the leakage detector may include at least one of a pressure sensor, a temperature sensor, and a hydrocarbon sensor.

In some embodiments, the leakage manifold may be a fluid compartment having predetermined volume and arranged in fluid communication with the leak capture channel, the leakage manifold including no more than two ports for communication outside of the fuel injector. In some embodiments, the leakage manifold may include no more than one port for communication outside of the fuel injector. In some embodiments, the leakage manifold may include no ports for communication outside of the fuel injector.

According to another aspect of the present disclosure, a gas turbine engine may include a power train including a compressor, combustor, and a turbine, the compressor arranged to receive rotation power from the turbine to compress air, the combustor including combustion chamber arranged to receive air from the compressor and fuel for combustion to form exhaust products, the turbine including a rotor and blade extending from the rotor to receive exhaust products expanding across the blades to drive rotation of the rotor, and a fuel injector. The fuel injector may include a nozzle configured to discharge fuel into the combustion chamber, a stem coupled to the nozzle and configured to conduct fuel to the nozzle, and a microchannel fuel heat exchanger. In some embodiments, the microchannel fuel heat exchanger may be formed as a fuel-air heat exchanger. The microchannel fuel-air heat exchanger may be formed integral with the stem and including a fuel passageway fluidly coupled with the nozzle to pass fuel and a cooling air passageway arranged in thermal communication with the fuel passageway to transmit heat to fuel within the fuel passageway. The fuel-air heat exchanger may include a leak management system arranged to guide, leakage from at least one of the fuel and cooling air passageways to discourage hazardous condition formation, wherein each of the fuel and cooling air passageways are microchannel passageways.

In some embodiments, the leak management system may include a leakage capture channel. In some embodiments, the leakage capture channel may be arranged at least partly between fuel passageway and the heat source passageway for capturing and guiding leakage.

In some embodiments, the fuel heat exchanger may include an interface wall disposed between and providing thermal communication between the fuel and air passageways, the leak capture channel formed at least partially within the interface wall. In some embodiments, the interface wall may include at least one communication bridge for thermal communication between the fuel and air passageways. The communication bridge may extend through the leak capture channel.

In some embodiments, the at least one communication bridge may be formed as a pin arranged to conduct heat transfer between the cooling air passageway and the fuel passageway. In some embodiments, the fuel-air heat exchanger may include a number of plates that are etched and bonded together to form each the fuel passageway, the cooling air passageway, and the leakage capture channel.

In some embodiments, the leak management system may include a leakage manifold fluidly coupled with the leak capture channel to receive leakage. In some embodiments, the leak management system may include at least one of a pressure sensor, a temperature sensor, and a hydrocarbon sensor arranged to detect the presence of leakage. The leakage manifold may be a fluid compartment having predetermined volume and arranged in fluid communication with the leak capture channel. The leakage manifold may include no more than two ports for communication outside of the fuel injector.

In some embodiments, the leakage manifold includes no more than one port for communication outside of the fuel injector. In some embodiments, the leakage manifold may include no ports for communication outside of the fuel injector. In some embodiments, the fuel injector may be one of a number of fuel injectors each including a respective microchannel heat exchanger.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
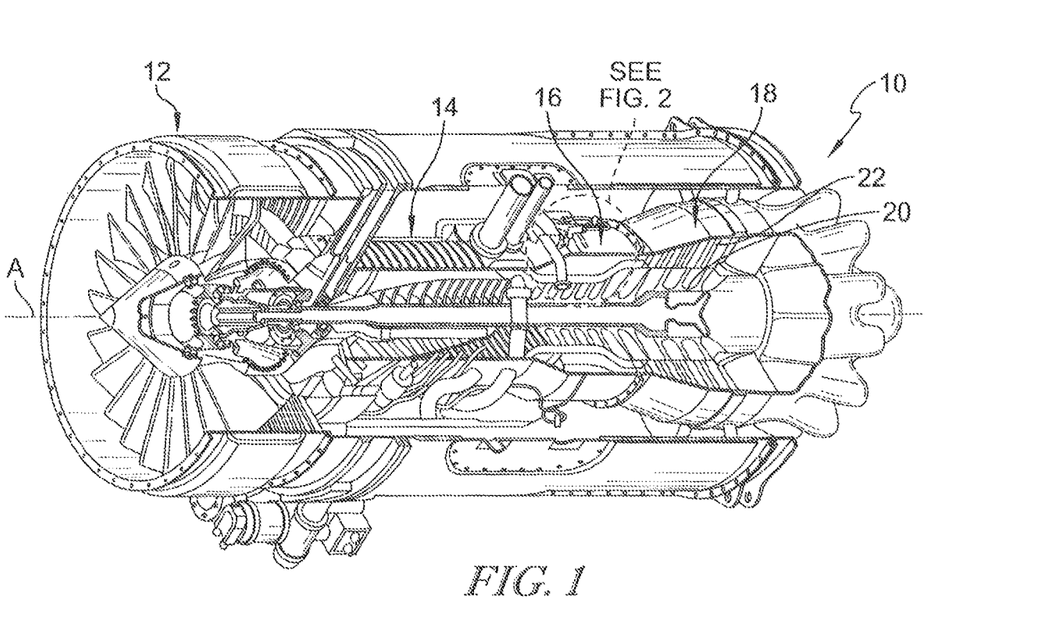
FIG. 1 is a cut-away perspective view of a gas turbine engine showing that the engine includes a fan, a compressor, a combustor, and a turbine.

An illustrative gas turbine engine 10 includes a fan 12, a compressor 14, a combustor 16, and a turbine 18 as shown in FIG. 1. The fan 12 and the compressor 14 are illustratively driven by the turbine 18 to provide air for engine use. The compressor 14 compresses and delivers air to the combustor 16. The combustor 16 mixes fuel with the compressed air received from the compressor 14 and ignites the fuel. The hot, high-pressure exhaust products of the combustion reaction in the combustor 16 are directed into the turbine 18. The turbine 18 illustratively includes a rotor 20 and blades 22 extending radially from the rotor 20 to receive force from the expansion of the exhaust products to drive the rotor 20 to rotate about a central axis A. As used herein, directional references generally relate to the central axis A of the engine 10.

Preheating fuel before delivery to the combustor 16 can provide certain performance gains. One source of waste heat which can provide heating to the fuel is compressor discharge and/or bleed air. Compressed air that has transferred heat to the fuel can be used as cooling air for other areas of the gas turbine engine 10, for example, within the turbine 18. Performing such heat exchange near the point of fuel injection can avoid risks of inadvertent combustion.

Figure 2:
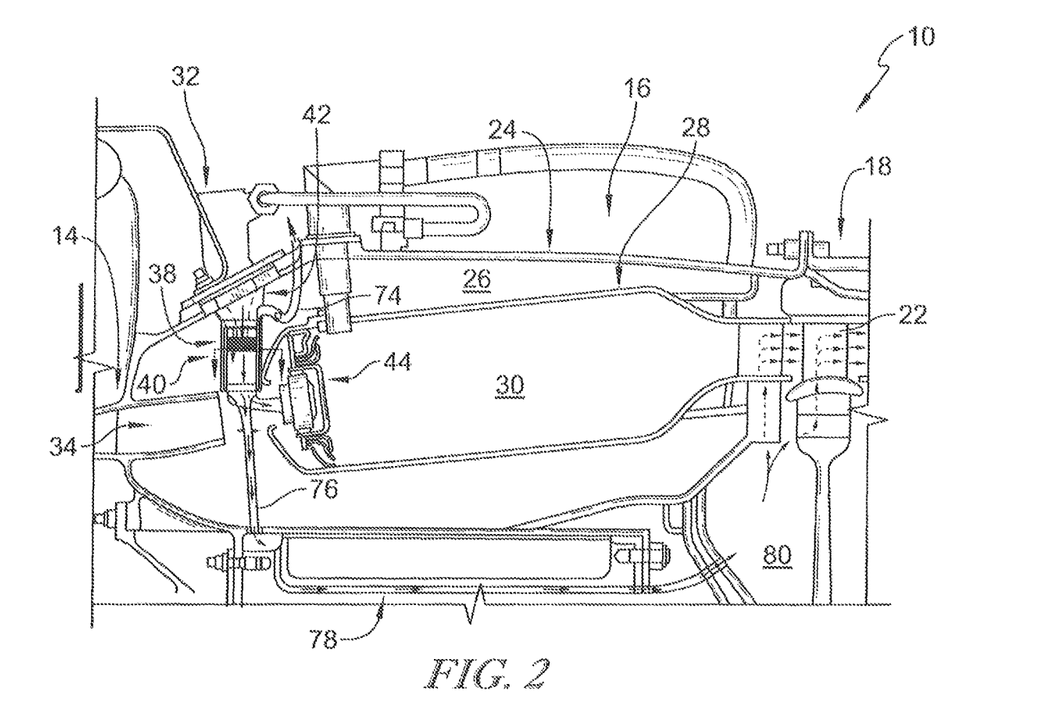
FIG. 2 is a partial sectional view of the gas turbine engine of FIG. 1 showing that a fuel injector is coupled to an outer combustor case aft of the compressor and forward of the combustor, and suggesting that air from the compressor is directed through a heat exchanger integrated into the fuel injector to transfer heat to fuel products also flowing through the heat exchanger before injection into a combustion cavity, and showing that the heat exchanger includes a leak management system for discouraging combustion conditions.

As shown in FIG. 2, the combustor 16 illustratively includes an outer combustor casing 24 defining a cavity 26 therein. The cavity 26 of the combustor casing 24 illustratively provides a high-pressure plenum for high-pressure products flowing within the combustor 16. The cavity 26 includes an compressed air inlet 34 for receiving compressed air from the compressor 14. The combustor 16 illustratively includes a combustion liner 28 defining a combustion chamber 30 for combusting fuel and air mixture, and a plurality of circumferentially spaced fuel injectors 32 arranged to provide fuel to the combustion chamber 30.

As shown in FIG. 2, the fuel injectors 32 illustratively extend radially from outside the outer casing 24 to an inlet 36 of the combustion liner 28. The fuel injectors 32 illustratively penetrate through the outer casing 24 to enter to the cavity 26. Each fuel injector 32 illustratively includes a heat exchanger 38 for transferring heat to the fuel before injection into the combustion chamber 30.

Heating combustible fuel can present challenges including the potential for inadvertent ignition. In adapted use of gas turbine engines for aerospace applications, fuel near the injector can have near critical conditions and maintaining safe and effective fuel heating can be of particular concern. By performing heat transfer to the fuel at a location near to the point of fuel injection into the combustion chamber 30, the instantaneous volume of heated fuel can be reduced. For example, by reducing the distance between the heat exchange and the injection point (here the combustion chamber 30), the transport volume of heated fuel can be reduced and thus the risk and/or the impact of inadvertent combustion of fuel can be reduced. In the illustrative embodiment, the heat exchanger 38 is formed integral with the fuel injector 32 and disposed within the cavity 26 as shown in FIG. 2. The heat exchanger 38 illustratively includes a leak management system 40 for additionally and/or alternatively reducing risk of inadvertent combustion.

As shown in FIG. 2, each fuel injector 32 illustratively includes a stem 42 conducting fuel therethrough and a nozzle 44. The nozzle 44 is fluidly coupled with the stem 42 to receive fuel and arranged at the combustion liner 28 to direct fuel into the combustion chamber 30. The heat exchanger 38 is illustratively formed integrally with the stem 42 and includes a leak management system to guide leakage to inhibit risk of combustion. The heat exchanger 38 illustratively heats fuel flowing through the stem 42 and the leak management system 40 captures leakage in the heat exchanger 38 to reduce the risk of inadvertent combustion.

Figures 3, 4, 5:
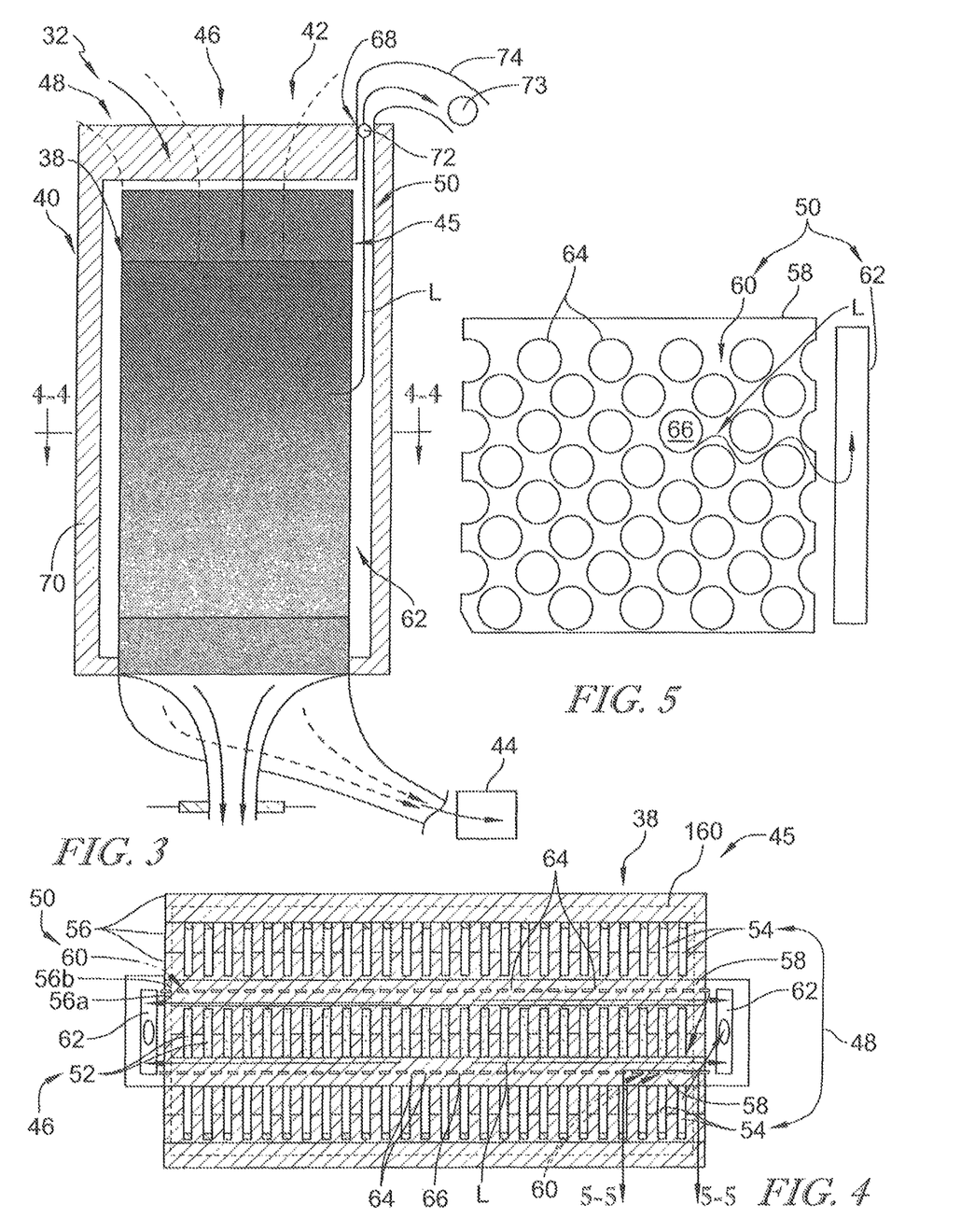
FIG. 3 is an enlarged view of the heat exchanger of FIG. 2 showing that the heat exchanger includes a body having a cooling air passageway and a separate fuel passageway are formed in a stem of the fuel injector to provide the heat exchanger integrated into the fuel injector and showing that the leak management system includes a leak manifold for guiding leakage from the passageways.
FIG. 4 is a cross-sectional view taken along line 4-4 in FIG. 3 showing that the cooling air and fuel passageways include microchannels through which the air and fuel pass in thermal communication with each other, and showing that an interface wall is arranged between the cooling air and fuel passageways and showing that the interface walls each include communication bridges (pins) and define a leak capture channel for capturing and guiding leaking to the leak manifold and to an outlet port.
FIG. 5 is a cross-sectional view taken along the line 5-5 in FIG. 4 showing that the pins extends in a pattern and extend through the leak capture channel and suggesting that a leakage can pass through the leak capture channel to the leak manifold.

As shown in FIG. 3, the heat exchanger 38 illustratively includes a body 45 defining a fuel passageway 46 for receiving fuel and an air passageway 48 for receiving air. The fuel and air passageways 46, 48 are formed in thermal communication with each other to heat the fuel within the stem 42 on its way to the nozzle 44. In the illustrative embodiment, the leak management system 40 includes leak capture network 50 arranged to guide leakage from the heat exchanger 38. As explained in additional detail below, the leak capture network 50 provides a receptacle to contain leakage, for example, fuel leakage, to provide a limited volume leakage area. The heat exchanger 38 is illustratively formed as a microchannel heat exchanger having portions of the leak capture network 50 formed therein.

As shown in the cross-section of FIG. 4, the fuel passageway 46 and air passageway 48 are each illustratively formed to include microchannels 52, 54 of the heat exchanger 38. In the illustrative embodiment, the fuel passageway 46 includes fuel microchannels 52 and the air passageway 48 include air microchannels 54, each microchannel 52, 54 extending longitudinally along the body 45 (into the page in FIG. 4). The body 45 of the heat exchanger 38 is illustratively formed of sheets 56 having portions of the microchannels 52, 54 etched therein and being stacked together to form the passageways 46, 48. In the illustrative embodiment, the etched sheets 56 are stacked and bonded together using diffusion bonding, but in some embodiments may be formed in any suitable manner and/or arrangement to provide suitable heat exchange within limited space and including portions of the leak capture network 50 as disclosed herein.

The body 45 of the heat exchanger 38 illustratively includes heat exchange interface walls 58 arranged between the fuel microchannels 52 and the air microchannels 54. The interface walls 58 each illustratively conduct heat from the air passageway 48 to the fuel passageway 46 and each define a leak capture channel 60 therein as a portion of the leak capture network 50 to inhibit inadvertent combustion. In the illustrative embodiment, the leak capture channel 60 is formed as a chain of void space that communicates with a leak manifold 62 as another portion of the leak capture network 50 for guiding leakage.

As shown in the further cross-section of FIG. 5, each interface wall 58 illustratively includes a number of communication bridges 64 arranged to conduct heat between the air and fuel passageways 46, 48. In the illustrative embodiment, the communication bridges 64 are formed as pins that extend between one sheet 56*a* of the interface wall 58 and an adjacent sheet 56*b* to conduct heat from the air passageway 48 to the fuel passageway 46 (the one sheet 56*a* and the adjacent sheet 56*b* together defining an interface wall 58).

The leak capture channel 60 is illustratively defined between the communication bridges 64 to guide leakage to the leak manifold 62.

Referring to FIG. 5, the communication bridges 64 illustratively extend through leak capture channel 60 (out from the page in FIG. 5, and vertically in FIG. 4) to connect with the adjacent sheet 56b. In the illustrative embodiment, the leak capture channel 60 is formed by etching the voids of the leak capture channel 60 into the single sheet 56a and leaving the communication bridges 64 to remain. In some embodiments, features of the interface wall 58 may be formed in any suitable arrangement or manner, for example, pins may be formed in more than one sheet and combined end-to-end to form the communication bridges 64 and/or to define the leak capture channels 60.

As shown in FIG. 5, an exemplary leakage L develops near one communication bridge 66 as result of an imperfection of the heat exchanger 38. The imperfection may be formed as a crack as the result of manufacturing fault, fatigue, breakage, wear, and/or other means. The leakage L is illustratively a fuel leakage from the fuel passageway 46 that migrates into the leak capture network 50 for containment, although leakage L may also represent an air leakage. The leakage L illustratively enters the leak capture channel 60 and towards the leakage manifold 62. As the leak capture network 50 is formed of microchannels having limited volume, the potential and/or magnitude of inadvertent combustion is reduced because little oxygen is available. The arrangement of the leak capture channels 60 between the passageways 46, 48 at the thermal interface (within interface walls 58) can increase the likelihood that a leakage L will migrate to the leak capture network 50 for containment.

Returning briefly to FIG. 3, the leak manifold 62 is illustratively defined around the body 45 of the heat exchanger 38 by a shroud 70. The leak manifold 62 illustratively includes an outlet port 68 penetrating through the shroud 70 for discharge of leakage to predetermined controlled areas. The leak management system 40 illustratively includes a leak detector 72 arranged within the leak capture network 50, embodied as a hydrocarbon sensor, for detecting the presence of leakage.

An additional leak detector 73 may be arranged in fluid communication with the leak capture network 50 for additional analysis of the contents thereof. In some embodiments, the leak detectors 72, 73 may each include one or more of a pressure, temperature, hydrocarbon, and/or other sensors. In some embodiments, either or both of the leak detectors 72, 73 may be arranged in communication with a control system of the gas turbine engine to determine and/or execute applicable operation criteria, for example, fuel shut-off to the corresponding fuel injector 32. In some embodiments, the leak manifold 62 may include an inlet port for limited circulation of fluids to enable more remote leakage analysis. In the illustrative embodiment, the outlet port 68 communicates leakage L through a conduit 74 which exhausts outside of the outer casing 24. In some embodiments, the outlet port 68 may exhaust into the cavity 26, and/or elsewhere as suitable.

Figure 6:
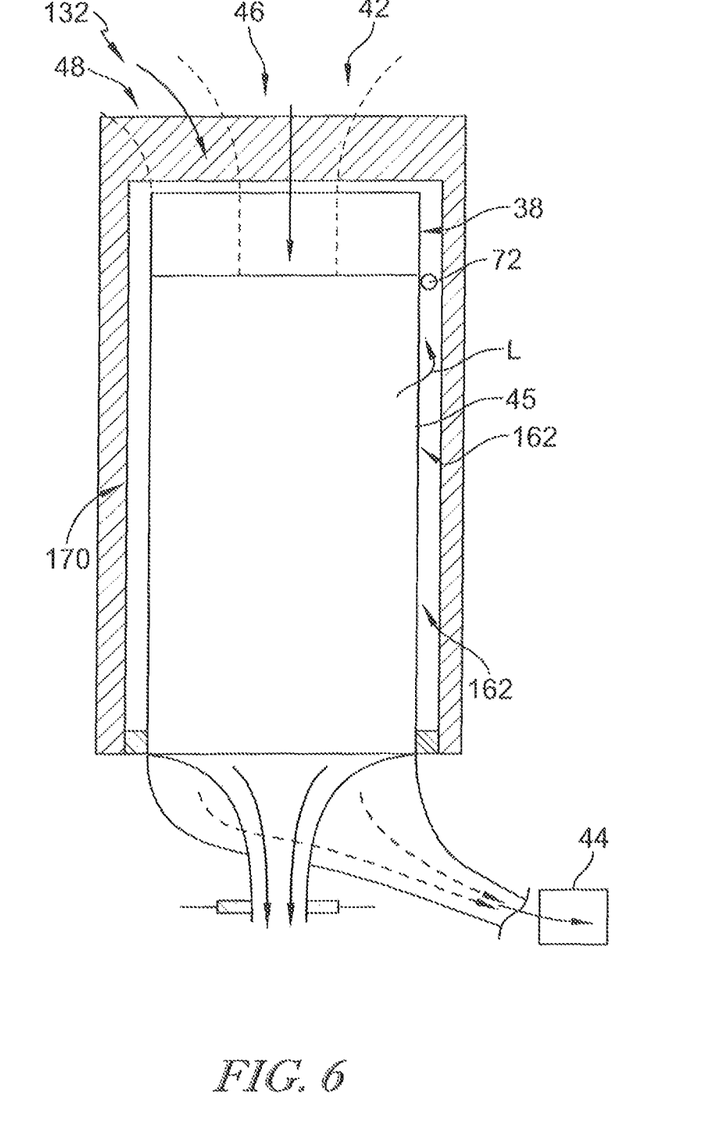
FIG. 6 is an enlarged view of FIG. 2 having another embodiment of a heat exchanger similar to the heat exchanger in FIGS. 3-5, except being formed as, a sealed heat exchanger having no ports.

As shown in FIG. 6, a cross-section of another embodiment of a fuel injector 132 adapted for use in gas turbine engine 10 includes a shroud 170 defining the leak manifold 162. The shroud 170 includes no ports (i.e., outlet port 68) and forms as a sealed compartment and pressure fluctuation can be monitored by a pressure sensor to determine whether leakage (fuel and/or air) has occurred. In some embodiments, the sealed leak manifold 162 can be placed into vacuum. The sealed shroud 170 can provide additional inhibition of inadvertent combustion by reducing the amount of oxygen available to interact with a fuel leakage within the volume of the leak capture network 50. In some embodiments, an inert gas may be injected into the sealed compartment to abate combustible conditions.

Returning briefly to FIG. 2, the healed fuel exiting the heat exchanger 38 is sent to the nozzle 44 to be dispersed to the combustion chamber 30 for combustion. The cooled compressor discharge air having provided heat to the fuel can be used as cooling air in various portions of the turbine. In the illustrative embodiment, the cooling air can be routed in conduit 76 through an inner portion 78 of the engine and into an inner wheel cavity 80 of the turbine 18. The cooling air can be vented from the inner wheel cavity 80 into the flow path of the combustion products for cooling, for example, at an inlet to the turbine 18 (outlet of combustor) and/or through turbine components (e.g., blades 22).

The present disclosure includes designs and methodologies for fuel injectors having integrated heat exchanger, but may be applied to other hot fuel components besides fuel injectors. The present disclosure includes arrangement of a leakage capture zone between the fuel and any large volume of air in the fuel heating system (e.g. cooled cooling air (CCA) and/or surrounding ambient air) and may include detecting leakage. The leakage capture zone can have very limited air available to prevent large amounts of combustion from taking place. In addition, the leakage capture zone may transmit any leaked air or hydrocarbon fumes for detection by a sensor to detect the leakage effects, for example, by constituent and/or pressure detection. When excessive leakage effects are detected, the flow to the fuel injector can be shut down to prevent potential catastrophic failure.

The present disclosure includes microchannel heat exchangers for conducting heat transfer to heat fuel before injection into the combustion chamber. Such microchannel heat exchangers may include printed circuit heat exchangers formed through an etching process to enable small leakage capture zones. Such designs and manufacturing technique may offer smaller features than would be possible with conventional heat exchanger manufacturing techniques (e.g. brazed plate-fin), increasing surface area, decreasing required sizing criterion, and reducing combustion space within the leakage areas. Moreover, conventional heat exchanger designs may be challenging to build into a complete enclosure, to minimize thermal resistance between the flow passages, and/or may imposed large volumes which could make detection of a small leak more difficult.

The present disclosure includes heat exchangers formed of multiple layers of thin metal sheets that may be etched to provide flow passages. These sheets may then be stacked and compressed and then diffusion bonded in a furnace. In fuel-air heat exchange, a risk of handling high temperature fuel is that a fuel leak can result in uncontrolled oxidation of the fuel. The risk of inadvertent combustion of fuel can be reduced according to the present designs and methodologies.

The present disclosures includes heat exchangers having additional (metal) layers with passages that neither carry fuel nor the hot liquid to be cooled, e.g. air. These additional passages could be designed to create a full enclosing space (or partial enclosing space if certain parts of the design pose acceptably low risks of leakage) between the hot fuel and the air, in order to intercept any fuel leakage from cracks, that could develop. The voids/passages would be etched into a metal sheet and many pins/lands would be retained. These etched sheets could be added to the sheet stack during the diffusion handing process. These pins could bond to the adjacent sheet and then provide a thermal path to transfer heat from the hot fluid to the fuel. Pins may provide a strong opportunity for an imperfection to propagate into the leak capture network 50. In some embodiments, ribs and/or features of other shapes could also be used with or instead of pins. In some embodiments, the smaller the pin diameter, the smaller the crack/leakage size that may be detectable and/or the smaller the pin diameter, the less lateral conduction that must take place to transfer heat around the voids. In some embodiments, the pin height may be reduced to reduce thermal resistance and the size of the overall heat exchanger.

The present disclosure includes collection of any fumes from the many small voids/passages and can provide a larger channel to direct hydrocarbon fumes out of a single port on the fuel injector. These channels may also be made small for at least the reasons disclosed. Leakage of fuel may quickly evaporate or vaporize and fill the enclosure voids with a high concentration of hydrocarbons for sensing. A single outlet port be advantageous to reduce the number of sensors, to reduce the amount of air in contact with any fuel leakage, to reduce the risk of uncontrolled oxidation, to reduce the air volume and/or to concentrate hydrocarbon fumes and therefore make leakage detection possible at a lower leakage rate. Multiple sensors may reduce false detection. Locating sensors within the upper, cooled section of the heat exchange can provide for sensor protection.

Designs including a single exhaust port from the leak capture zone may exhaust to one or more of several locations. A first possible location would be to exhaust to the compressor discharge region (e.g., cavity 26). In this case two sensors may help assess the source of hydrocarbon fumes. The combustor environment of the engine could have hydrocarbon fumes due to the combustion process. Sensor 2 may provide a reading of the ambient hydrocarbon environment. The control system could then compare the readings of sensor 1 to readings at sensor 2, in order to determine if the fuel flow to the nozzle should be stopped. One may also arrange sensors in a cool environment as generally available. One likely location, would be in the injector head (upstream portion) where colder fuel enters the injector. The benefit of this exit port location is that it may prevent the exhaust fumes and fuel from passing outside of the combustor case, should a leak be intercepted.

Another possible location to exhaust the leak capture zone may include venting outside of the combustor case. For example, the leak capture zone may be vented to a fan stream. Benefits of this approach may include that the sensors are at a lower temperature and also the possibility of eliminating sensor 2. Examples of acceptable sensors may include high temperature micro-machined sensors. The small size of these sensors may make sensor integration much easier and lighter.

This concept could also be applied with additive layer manufacturing technologies. In addition, the collection passages can be designed to suppress the propagation of a flame through air velocity control. Flame arresting material can also be used to suppress flame propagation. In some embodiments, any suitable heat source medium can be applied through the cooling air passageway to provide heat to the fuel, for example but without limitation, a suitable (relatively hot) refrigerant for providing heat rejected to the fuel. In some embodiments, the microchannel heat exchanger may be structurally distinct from the stem of the fuel injector and/or be located separately from the fuel injector, and fuel and heat source medium may be fluidly communicated to and/or from the microchannel heat exchanger. Accordingly, in such embodiments, the advantages of leak detection as disclosed herein can be realized independently of the integral formation of the microchannel heat exchanger and the fuel injector.

The present disclosure includes arrangement of the leakage capture channel between the fuel passageway and air passageway. But in some embodiments, the microchannel heat exchanger may optionally include leakage capture channel 160 (as suggested in FIG. 4 in dashed line). The leakage capture channel may be disposed at any position adjacent to any fuel and/or air passageway, for example, adjacent to one or more microchannels of the fuel and/or air passageway proximate to an outer edge of the heat exchanger body, and in such embodiments, communication bridges may be formed as pins extending between opposite walls that define the leakage capture channel 160 for structural integrity. In such arrangements, the leakage capture channel 160 may be included in addition to or in place of the leakage capture channel 60, and may be included in embodiments where the fuel and air passages are transposed in position, such that fuel is passed through microchannels 54 and air is passed through microchannels 52. In some embodiments, the microchannel heat exchangers of the present disclosure may be located outside of the high pressure cavity and/or may be distinct from the fuel injector itself.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fuel injector for a gas turbine engine, the injector comprising
   a nozzle configured to discharge fuel into a combustion chamber included in the gas turbine engine,
   a stem coupled to the nozzle and configured to conduct fuel to the nozzle, and
   a microchannel fuel-air heat exchanger integral with the stem and including a fuel passageway fluidly coupled with the nozzle to pass fuel and a cooling air passageway arranged in thermal communication with the fuel passageway to transmit heat to fuel within the fuel passageway, the fuel-air heat exchanger including a leak management system arranged to guide leakage from at least one of the fuel and cooling air passageways to discourage hazardous condition formation,
   wherein each of the fuel and cooling air passageways are microchannel passageways,
   wherein the leak management system includes a leakage capture channel arranged for capturing and guiding leakage,
   wherein the fuel-air heat exchanger includes an interface wall disposed between and providing thermal communication between the fuel and air passageways, the leak capture channel formed at least partially within the interface wall,
   wherein the interface wall includes at least one communication bridge for thermal communication between the fuel and air passageways, the communication bridge extending through the leak capture channel.

2. The fuel injector of claim 1, wherein the at least one communication bridge is formed as a pin arranged to conduct heat transfer between the cooling air passageway and the fuel passageway.

3. The fuel injector of claim 1, wherein the at least one communication bridge includes a plurality of pins extending through the leak capture channel to conduct heat transfer between the cooling air passageway and the fuel passageway.

4. The fuel injector of claim 1, wherein the leak capture channel is formed as a microchannel cavity and arranged to capture leakage from the fuel passageway passing through the interface wall on occurrence of an imperfection.

5. The fuel injector of claim 4, wherein the imperfection includes a crack in the interface wall extending between the leak capture channel and at least one of the fuel and air passageways.

6. A fuel injector for a gas turbine engine, the injector comprising
    a nozzle configured to discharge fuel into a combustion chamber included in the gas turbine engine,
    a stem coupled to the nozzle and configured to conduct fuel to the nozzle, and
    a microchannel fuel-air heat exchanger integral with the stem and including a fuel passageway fluidly coupled with the nozzle to pass fuel and a cooling air passageway arranged in thermal communication with the fuel passageway to transmit heat to fuel within the fuel passageway, the fuel-air heat exchanger including a leak management system arranged to guide leakage from at least one of the fuel and cooling air passageways to discourage hazardous condition formation, wherein each of the fuel and cooling air passageways are microchannel passageways,
    wherein the leak management system includes a leakage capture channel arranged for capturing and guiding leakage,
    wherein the leakage capture channel is arranged at least partly between fuel passageway and the cooling air passageway,
    wherein the leak management system includes a leakage manifold fluidly coupled with the leak capture channel to receive leakage.

7. The fuel injector of claim 6, wherein the leak management system includes a leakage detector arranged within the leakage manifold to detect the presence of leakage.

8. The fuel injector of claim 7, wherein the leakage detector includes at least one of a pressure sensor, a temperature sensor, and a hydrocarbon sensor.

9. The fuel injector of claim 6, wherein the leakage manifold is a fluid compartment having predetermined volume and arranged in fluid communication with the leak capture channel, the leakage manifold including no more than two ports for communication outside of the fuel injector.

10. The fuel injector of claim 9, wherein the leakage manifold includes no more than one port for communication outside of the fuel injector.

11. The fuel injector of claim 9, wherein the leakage manifold includes no ports for communication outside of the fuel injector.

12. A gas turbine engine comprising
    a power train including a compressor, combustor, and a turbine, the compressor arranged to receive rotation power from the turbine to compress air, the combustor including a combustion chamber arranged to receive air from the compressor and fuel for combustion to form exhaust products, the turbine including a rotor and blade extending from the rotor to receive exhaust products expanding across the blades to drive rotation of the rotor, and
    a fuel injector comprising
        a nozzle configured to discharge fuel into the combustion chamber,
        a stem coupled to the nozzle and configured to conduct fuel to the nozzle, and
        a microchannel fuel-air heat exchanger integral with the stem and including a fuel passageway fluidly coupled with the nozzle to pass fuel and a cooling air passageway arranged in thermal communication with the fuel passageway to transmit heat to fuel within the fuel passageway, the fuel-air heat exchanger including a leak management system arranged to guide leakage from at least one of the fuel and cooling air passageways to discourage hazardous condition formation, wherein each of the fuel and cooling air passageways are microchannel passageways,
        wherein the leak management system includes a leakage capture channel arranged for capturing and guiding leakage,
        wherein the leakage capture channel is arranged at least partly between fuel passageway and the cooling air passageway,
        wherein the leak management system includes a leakage manifold fluidly coupled with the leak capture channel to receive leakage.

13. The fuel injector of claim 12, wherein the fuel-air heat exchanger includes an interface wall disposed between and providing thermal communication between the fuel and air passageways, the leak capture channel formed at least partially within the interface wall.

14. The fuel injector of claim 13, wherein the interface wall includes at least one communication bridge for thermal communication between the fuel and air passageways, the communication bridge extending through the leak capture channel.

15. The fuel injector of claim 13, wherein at least one communication bridge is formed as a pin arranged to conduct heat transfer between the cooling air passageway and the fuel passageway.

16. The fuel injector of claim 12, wherein the fuel-air heat exchanger includes a number of plates that are etched and bonded together to form each of the fuel passageway, the cooling air passageway, and the leakage capture channel.

17. The fuel injector of claim 12, wherein the leak management system includes at least one of a pressure sensor, a temperature sensor, and a hydrocarbon sensor arranged to detect the presence of leakage.

18. The fuel injector of claim 12, wherein the leakage manifold is a fluid compartment having predetermined volume and arranged in fluid communication with the leak capture channel, the leakage manifold including no more than two ports for communication outside of the fuel injector.

19. The fuel injector of claim 18, wherein the leakage manifold includes no more than one port for communication outside of the fuel injector.

20. The fuel injector of claim 18, wherein the leakage manifold includes no ports for communication outside of the fuel injector.

21. The fuel injector of claim 12, wherein the fuel injector is one of a number of fuel injectors each including a respective microchannel heat exchanger.

* * * * *